UNITED STATES PATENT OFFICE.

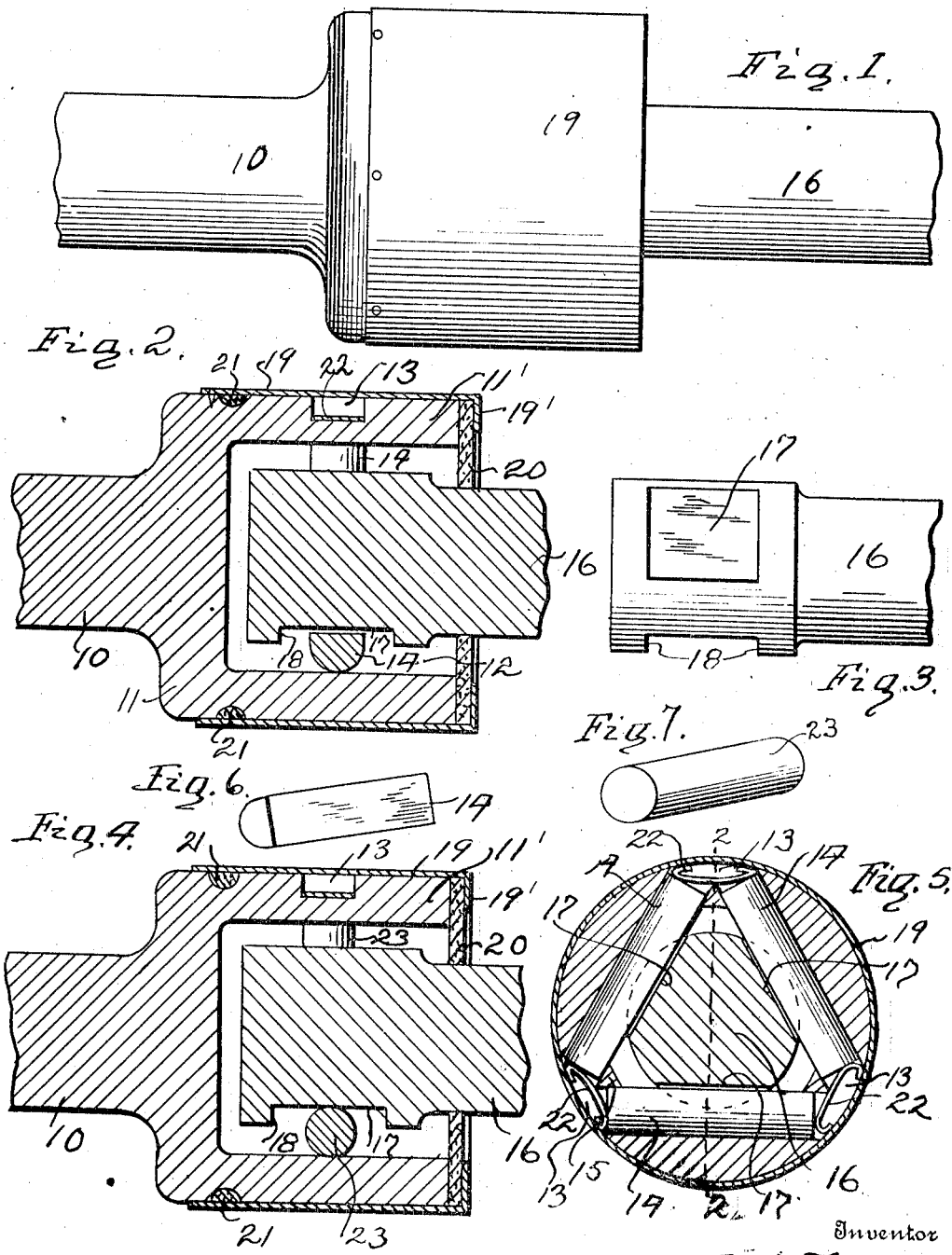

EDWARD J. TIRRELL, OF FLINT, MICHIGAN.

UNIVERSAL JOINT.

1,112,869.  Specification of Letters Patent.  Patented Oct. 6, 1914.

Application filed December 28, 1912. Serial No. 739,162.

*To all whom it may concern:*

Be it known that I, EDWARD J. TIRRELL, a citizen of the United States, residing at Flint, in the county of Genesee and State of Michigan, have invented certain new and useful Improvements in Universal Joints, of which the following is a specification.

This invention comprehends improvements in universal joints and more particularly those of the type which are especially adapted for use as shaft couplings.

The primary object of the invention is to provide a joint of this nature in which two shafts may readily adjust themselves longitudinally and also be capable of a slight angular adjustment.

A more specific object of the invention is to provide a universal joint including a casing having a plurality of pins secured therein for engagement by a shaft.

The invention also aims to generally improve universal joints of this nature to render them more useful and commercially desirable.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a side elevation of my invention, Fig. 2 is a longitudinal sectional view through the same, taken upon the plane of line 2—2 of Fig. 5, Fig. 3 is an elevation of one end of one of the shafts, Fig. 4 is a view similar to Fig. 2, showing slightly modified pins, Fig. 5 is a transverse sectional view through the form of my device, shown in Figs. 1 and 2, Figs. 6 and 7 are detail perspective views of various forms of pins capable of use with my invention.

In the following description and accompanying drawings, similar parts will be referred to and designated by like characters of reference.

Referring in detail to the drawings by numerals, 10 designates a portion of a shaft having its end enlarged, as at 11 and recessed to form the cylindrical end opening chamber 12. The wall 11' of the cylindrical chamber 12 is formed with a plurality of openings 13, which extend entirely through said wall to receive the pins 14. As clearly shown in Fig. 5, these pins are positioned so as to form an essentially triangular frame. The ends of said pins are supported by the walls of the openings 13, which openings form the reduced portions 15, which are essentially triangular in cross section. The pins 14 terminate short of the periphery of the wall 11' and have their inner faces flattened, as clearly shown in Fig. 7. A shaft 16 projects into the chamber between the pins 14 and has its periphery recessed to form three flattened surfaces 17 for engagement with the opposed faces of the pins 14. It will be noted upon reference to Fig. 2, that said recesses form shoulders 18, which are adapted to engage the pins 14 and thus limit the longitudinal movement of the two shafts relative to each other. As clearly shown in Fig. 5, the flattened portions 17 are spaced a slight distance from the pins 14 so as to allow the shaft 16 a slight angular play relative to the shaft 10.

A dust guard 19 encircles the enlarged portion 11 of the shaft 10 and is formed upon its outer end with an inwardly projecting flange 19', which serves to hold a preferably felt washer 20 against the end of the shaft 10 so as to protect the parts within the chamber 12 from dust and other foreign matter. A felt ring 21 is seated within an annular recess seated in the periphery of the enlarged portion 11 and engages the inner side of the guard 19. If desired, flat metal springs 22 may be placed within the outer ends of the openings 13 so as to bear against the ends of the pins 14 and restrict to a certain extent their longitudinal movement.

It will be noted that the construction heretofore described provides a shaft coupling or universal joint in which the two shafts may be adjusted longitudinally and also angularly to a slight extent. The flattened portions of the pins 14, by bearing against the flattened surfaces 17 will transmit the rotational movement of the shaft 10 to the shaft 16. The slight play provided by having the flattened surfaces 17 of the shaft 16 spaced a slight distance from the pins permits a limited angular adjustment of the two shafts.

In Fig. 4, I have shown pins 23, which are cylindrical for their entire length. These pins are positioned in a manner similar to that described for the pins 14 and are capable of rotation. By having the pins cylindrical very small surfaces are presented to the flattened portions of the shaft 16 so that a better chance for angular adjustment is provided without the necessity of having much play between said shaft and the pins. The fact that the pins 23 are capable of rotation also reduces the friction generated by the relative longitudinal movement of the two shafts.

From the foregoing description in connection with the accompanying drawings, it will be seen that I have provided a universal joint particularly adapted for use in connection with motor vehicles and so constructed as to be dust-proof, designed to permit a relatively large amount of longitudinal adjustment between the two shafts, and also to permit a certain amount of angular adjustment.

It is to be understood that I may make various changes in the embodiment of my invention, such as employing a greater number of pins and mounting them in different ways.

Having thus described my invention, what I claim is:—

1. In a universal joint, a shaft having a casing formed on one end thereof, the wall of said casing being provided with a plurality of openings, a plurality of pins positioned within said openings and extending within the interior of the casing to form a triangular frame, and a second shaft projecting between said pins and formed with flattened faces for engagement with the pins intermediate their ends.

2. A universal joint comprising a shaft having a casing formed on one end thereof, the wall of said casing being formed with a plurality of openings, a plurality of pins journaled within said openings and extending within the casing to form a triangular frame, and a second shaft projecting between said pins and formed with flattened surfaces for engagement with the pins intermediate their ends.

3. A universal joint including a shaft having a casing formed on one end thereof, the wall of said casing being provided with a plurality of openings, pins having their ends fitted within said openings, said pins extending within the casing to form a triangular frame, a second shaft extending within the casing between the pins and having flattened faces for engagement with said pins, and a sleeve surrounding said casing and covering the openings therein, whereby the pins are retained in their operative positions.

4. A universal joint comprising a shaft having a casing formed on one end thereof, the wall of said casing being provided with a plurality of openings, pins fitted within said openings and extending into the casing to form a triangular frame, a second shaft having its periphery recessed to provide flattened faces for engagement with said pins intermediate their ends, the recesses forming shoulders to limit the longitudinal movement of one shaft relative to the other, and a sleeve surrounding said casing and covering the openings therein, whereby the pins are retained in operative positions.

5. A universal joint including a shaft having a casing formed on one end thereof, three pins journaled at their ends within the wall of the casing, said pins extending within the casing to form a triangular frame, a second shaft extending between said pins, and having flat faces for engagement therewith, and means for retaining the pins in their operative positions.

6. A universal joint including a shaft having a casing formed on one end thereof, the wall of the casing being provided with a plurality of openings, a plurality of pins having their ends fitted within said openings, the pins extending within the casing to form a frame, a second shaft extending between the pins and having flat faces for engagement therewith, a sleeve surrounding the casing and covering said openings, and a plurality of springs interposed between the sleeve and the ends of the pins.

In testimony whereof I affix my signature in presence of two witnesses.

EDWARD J. TIRRELL.

Witnesses:
ROBERT A. GOTT,
RALPH A. MORSE.